United States Patent [19]

Wilcox

[11] 4,168,769

[45] Sep. 25, 1979

[54] ELECTRIC CURRENT COLLECTING SYSTEMS

[76] Inventor: Thomas W. Wilcox, Delway, 1 Astley Dr., Whitley Bay, Tyne and Wear, England, NE26 4AE

[21] Appl. No.: 847,445

[22] Filed: Nov. 1, 1977

[30] Foreign Application Priority Data

Nov. 2, 1976 [GB] United Kingdom ............... 45595/76

[51] Int. Cl.² .............................................. B60M 1/08
[52] U.S. Cl. ......................................... 191/21; 191/20
[58] Field of Search ............... 191/20, 21, 13, 22 DM, 191/29 DM, 33 PM

[56] References Cited

U.S. PATENT DOCUMENTS

| 484,924 | 10/1892 | Sutton | 191/21 |
|---|---|---|---|
| 484,924 | 10/1892 | Sutton | 191/21 |
| 504,104 | 8/1893 | Conklin | 191/21 |
| 528,494 | 10/1874 | Stearns | 191/21 |
| 554,450 | 2/1896 | Merkle | 191/21 |
| 575,303 | 1/1897 | Lomb | 191/21 |
| 3,830,989 | 8/1974 | Laurent | 191/22 DM |

FOREIGN PATENT DOCUMENTS

922599 1/1955 Fed. Rep. of Germany .... 191/29 DM

*Primary Examiner*—Reinhard J. Eisenzopf
*Attorney, Agent, or Firm*—Oblon, Fisher, Spivak, McClelland & Maier

[57] ABSTRACT

An electric current collection system comprises a continuously live conductor, a shield enclosing the continuously live conductor, and contact segments extending through the shield in a row extending along the length of the continuously live conductor and resiliently mounted so as normally to be electrically isolated from the continuously live conductor and from each other but adapted to co-operate with a current collecting device running along the row to make electrical contact with an external contact surface of each segment in succession and displace the segment to bring an internal contact surface afforded by it into electrical connection with an internal contact surface afforded by the continuous live conductor. Each segment includes a bar portion affording an internal contact surface and extending through the shield in a direction substantially perpendicular to the length of the live conductor and to the direction of displacement of the segment. The contact segments may be of generally Z shape, or may be straight bars extending through the walls of the shield for engagement by a current collector in the form of a sprocket wheel which may also provide a rack and pinion drive.

31 Claims, 15 Drawing Figures

ELECTRIC CURRENT COLLECTING SYSTEMS

BACKGROUND OF THE INVENTION

Field of the Invention

This invention relates to electric current collection systems, comprising a continuous live conductor, a shield enclosing the continuous live conductor, and contact segments extending through the shield in a row extending along the length of the continuous live conductor and resiliently mounted so as normally to be electrically isolated from the continuous live conductor and from each other but adapted to co-operate with a current collecting device running along the row to make electrical contact with an external contact surface of each segment in succession and displace the segment to bring an internal contact surface afforded by it into electrical connection with an internal contact surface afforded by the continuous live conductor.

According to one aspect of the present invention each segment includes a bar portion affording its internal contact surface and extending through the shield in a direction substantially perpendicular to the length of the live conductor and to the direction of displacement of the segment.

Whilst the invention is particularly applicable to a live conductor assembly mounted on the ground and engaged by a current collector pressing downwards on it, it is not necessarily limited thereto. Thus the current collector may press sideways or upwards against the live conductor. For convenience, however, references herein to upper and lower parts will be made assuming that the current collector is mounted above and presses down on the live conductor assembly.

Since the engagement between the internal contact surfaces is in the nature of a butt contact it is important that one or each surface should be capable of yielding, so as to avoid damage if the collecting device is a little too close to the live conductor, or failure to make contact if it is a little too far away.

Thus in one form of the invention the segments are resilient so that the internal contact surface of a segment engaging the continuous live conductor is free to yield resiliently relatively to the external contact surface engaging the current collector.

The external contact surface for engagement by a current collector may extend obliquely across the direction of movement of the collector. Thus one form of segment is formed of wire generally in the form of a 'Z' and bent so that the ends penetrate the sides of the shield to make contact with the live conductor while the middle limb extends obliquely across the top of the shield to be engaged by the current collector. Successive segments preferably overlap longitudinally so that a current collector member extending transversely across the shield will engage two or more segments simultaneously.

For applications such as tramways or street cars the shield is preferably accommodated in a trough which is sunk flush into the roadway and has overhanging sides forming a top with a narrow slot in it through which the row of contact segments is accessible, and the row of contact segments together with the adjacent portion of the shield have their upper surface flush with the top of the trough and virtually fill the slot.

In one form of the invention each segment comprises a straight rod extending transversely through the shield with its ends projecting to form a pin rack and which includes a current collecting device comprising a pinion affording sprockets meshing with the said rack, and providing the external contact surfaces.

According to another aspect of the invention an electric traction current collection system for a vehicle comprises a continuously live conductor, a shield enclosing the continuously live conductor, and contact segments extending through the shield in a row extending along the length of the continuously live conductor and resiliently mounted so as normally to be electrically isolated from the continuously live conductor and from each other, and a current collecting device carried by the vehicle and adapted to run along the row to make electrical contact with an external contact surface of each segment in succession and displace the segment to bring an internal contact surface afforded by it into electrical connection with an internal contact surface afforded by the continuously live conductor, in which the current collecting device comprises an electrically driven pinion and the segments extend through the insulating sheath and afford conducting teeth projecting so as to provide the external contact surfaces and to form a rack meshing with the driving pinion to effect a positive rack and pinion drive. Again each segment conveniently includes a straight rod extending transversely through the shield.

Preferably each segment is formed integrally in a single piece, for example from round rod material.

The internal contact surface of the continuously live conductor may be free to yield relatively to its support. Thus, the conductor may include a multiple strand, helically wound cable, either of hollow tubular form, or provided with a core of rubber or like resilient material, or a helical metal spring.

Conveniently the major part of the shield is formed by a member, referred to for convenience as a tyre, which is of resilient insulating rubber-like material of arch section, for example of truncated inverted V form.

Alternatively the system may include a pair of continuously live conductors, the segments being supported on a web of rubber or like resilient material located between the two live conductors.

If desired the portion of the shield remote from the contact segments may comprise a rigid base affording rails on surfaces remote from the shield, the current collector including reaction wheels running on such rails to control the extent to which the current collecting wheels displace the segments towards the continuously live conductor.

BRIEF DESCRIPTION OF THE DRAWINGS

Further features and details of the invention will be apparent from the following description of certain specific embodiments, which will be given by way of example with reference to the accompanying diagrammatic drawings, in which.

DETAILED DESCRIPTION OF THE PREFERRED EMBODIMENTS

Figure 1:
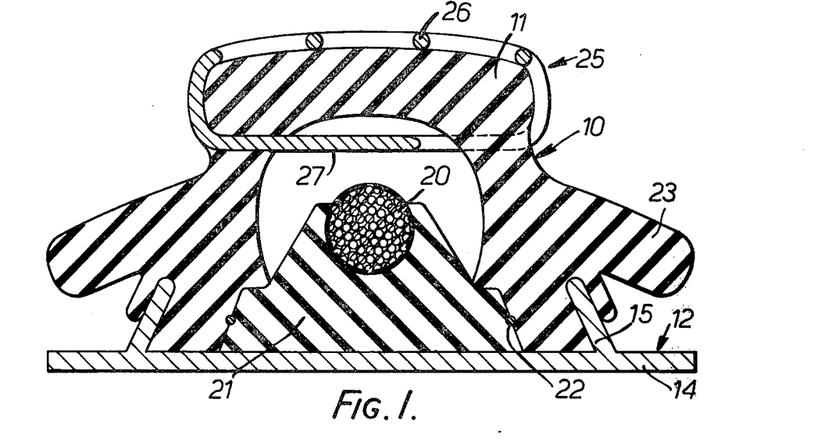
FIGS. 1 and 2 are a cross section and a plan view respectively of one form of safe current collecting system.
Figure 2:
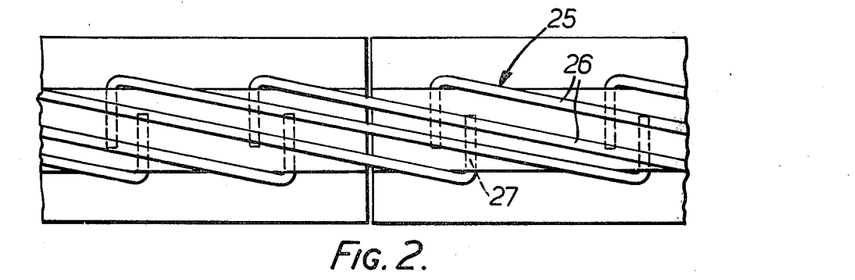

FIGS. 1 and 2 show one form of supply conductor assembly for a railway, which is to be laid at ground level with the current collecting device engaging it from above. The assembly comprises a tubular shield 10 having a cross section somewhat similar to that of a pneumatic tyre and wheel rim, and comprising an upper arched portion 11 which will be referred to for convenience as a tyre, and which is of truncated inverted V section and made of rubber, secured to a metal base 12 of generally channel section. Actually, as shown, the base comprises a flat bottom plate 14 and a pair of upstanding flanges 15 sloping upwards towards each other and received in corresponding grooves in the lower edge portions of the legs of the tyre which are formed with sheds 23. The base is secured on the sleepers of a railway track between the running rails.

The section of the tyre shown provides a bump stop, that is to say it provides a substantial increase of stiffness when the deflection exceeds a predetermined amount.

Within the shield is a continuous live conductor 20 in the form of a multi-strand cable having its lower part embedded in an insulating bed 21, which closes the open lower part of the tyre and may be sealed to it by a seal 22 working on the O-ring principle. The cable 20 forms a continuously energised live supply conductor.

The top of the tyre incorporates a number of conducting segments 25 of generally Z-shaped form, each comprising a long middle portion 26 which, as shown in FIG. 2, extends obliquely across the top of the tyre, outside it, and end portions 27 which extend down over the sides of the tyre and then horizontally in a direction transverse to the length of the conductor through a hole in the side of the tyre, and lie spaced a short distance e.g. half an inch, above the live conductor 20 to provide an isolating gap between the segments and the live conductor.

The end portions may be of arcuate form so that they can be inserted by turning about a central axis. They may also be provided with circumferential ribs to form a labyrinth seal.

The rubber tyre may be pressurized if desired with a gas such as $SF_6$ or nitrogen or a mixture of them, but in general the resilience of the tyre may be relied on to separate the internal contact surfaces.

As will be seen from FIG. 2 the segments overlap so that any line transverse to the conductor will pass through at least three of them.

The electric locomotive is fitted with a roller current collector which presses down on the movable contact segments successively as its runs along the track. The tyre is so proportioned and/or pressurized that considerable force, perhaps 1,000 lbs., is required to force the movable segments down into contact with the live conductor, and the collector is arranged to exert the necessary force so as to establish connection between it and the live conductor. On the other hand, a person or an animal may stand, fall, or even jump on the segments without danger or electric shock.

Figure 3:
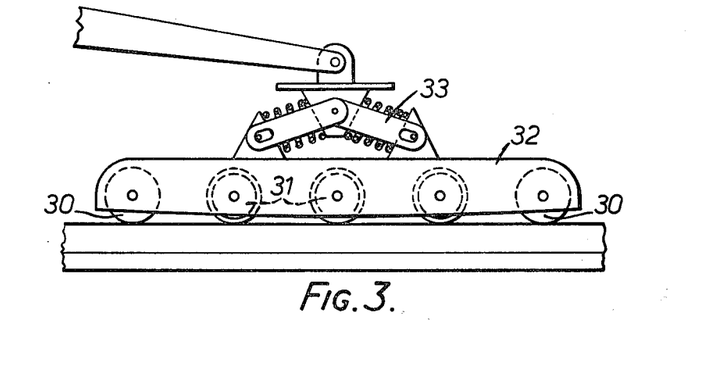
FIGS. 3 and 4 are respectively a side view and an end view of a current collector.
Figure 4:
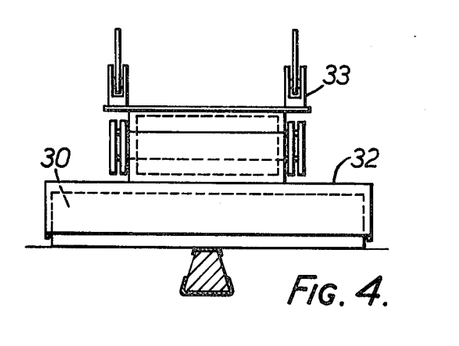

The current collector may take various forms. FIGS. 3 and 4 show diagrammatically an arrangement comprising five rollers in tandem, mounted on a chassis 22 carried by a conventional linkage 33, of which the leading and trailing rollers 30 are insulated or rubber covered, whilst the intermediate three rollers 31 are of conducting material such as stainless steel. In an embodiment where the rollers are of 12½ cm diameter, their centres are spaced 25 cm apart and lie on a curve of large radius (e.g. 4 to 6 metres) so as to press down each contact segment in turn and hold it down until a number of further segments have been pressed down.

Thus with a current collector comprising three current collector rollers in tandem, current is carried at any moment by at least nine pressure point-contacts between the collector and the segments. If the total force exerted is about 1,000 lbs. the pressure on each point-contact of about 100 lbs. will be ample to melt frost, crush foreign particles, etc. The spring force for each internal contact, which will be some 15 to 20 lbs, comes mainly from the strain in the limbs of the segments acting as springs, supplemented if necessary by the compression of the rubber above and below, and will be adequate to ensure clean contacts.

Figure 5:
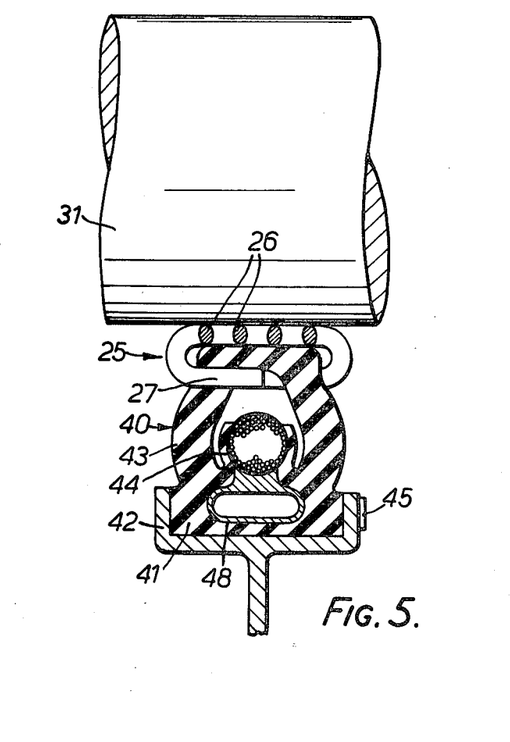
FIGS. 5 and 6 are respectively transverse and longitudinal sectional views of a further arrangement employing an integral shield.
Figure 6:
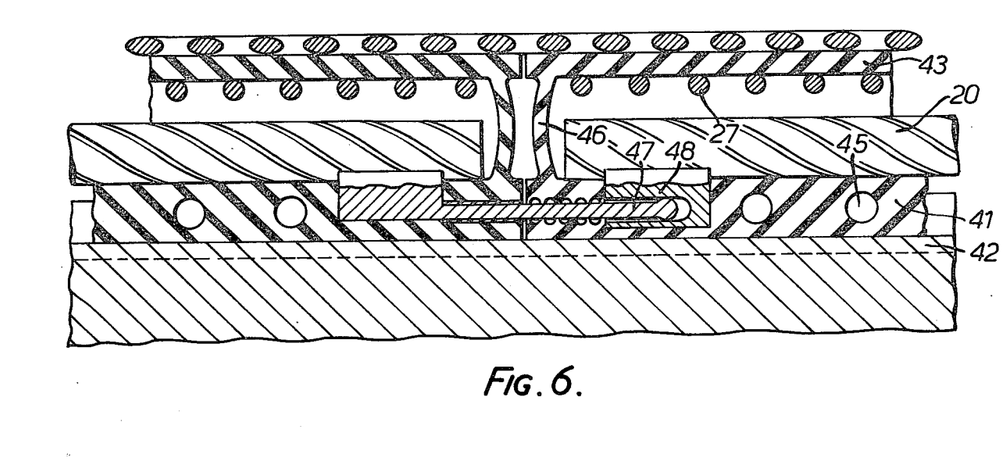

FIGS. 5 and 6 show an embodiment for use in mines or other situations where flameproof making and breaking of the contacts is required or weather conditions are particularly arduous. Thus it may enable an electrically propelled vehicle to negotiate snow or floods or even to travel completely submerged for submarine use or for crossing rivers or the like. In this case the live conductor is wholly enclosed in an insulating shield 40 of resilient material of which the section is formed integrally as a single piece, as by extrusion. Thus it differs from the prior arrangement described only in that each length of the insulating shield is formed in a single piece by extrusion so as to form an airtight tube with the copper conductor embedded in it, instead of being made up from a number of sections giving an assembly which may or may not be completely airtight.

The tyre may be wholly or partly made of semiconducting rubber to discharge capacitative charges which might produce sparking.

It will be assumed that the live rail is to be ladi on the ground with the current collecting device engaging it from above. The bottom 41 of the shield is of rectangular section to be received in a channel section support 42 of metal. The body of the shield comprises an outer portion 43 of arched section which together with the bottom forms an outer closed tube. An inner portion 44 of part tubular form is formed integrally with the outer tube and forms a bed for the live conductor with a slot exposing one side of it along the top for contact with the segments.

The live conductor 20 is of hollow section, for example comprising a multi-strand bare copper cable wound in coarse-pitch helices on an insulating rubber or elastomeric core which may itself be tubular.

The contact segments are similar to those shown in FIGS. 1 and 2 and bear the same reference numerals.

The bottom of the shield is secured in the channel section upper flange 42 of an I beam by means of locating dowels 45 passing through transverse horizontal holes extending through the shield.

FIG. 6 shows a joint between neighbouring lengths of the shield. Each end of a shield is closed by means of a flexible diaphragm 46 and opposite ends of each length are provided respectively with male and female plug-and-socket connectors 47, 48 extending parallel to the length of the shield. The plug contact secured to the end of the cable in one length projects from the latter through a labyrinth seal formed in the end of the shield of the adjacent length into the socket contact of the latter.

It will be appreciated that the Z-shaped contact segments are secured to the shields after the latter have been assembled in position (their end portions may be curved to facilitate this) and the oblique diagonal portions of two of them will bridge each gap between each pair of neighboring lengths of the shield.

Mechanical cleaning of the spaces between segments may be provided by a rotary brush fitted on the vehicle with its axis in the direction of travel so as to be rotated by the skew action of the segments on the bristles.

It will be noted that the cantilever ends 27 of the Z shaped segments, either due to their spacing from the top of the rubber shield or by digging into it, can rock or roll about the live conductor, to provide a rolling butt contact. This provides a very high mechanical advantage to break any partial welding at the final point of contact.

Figures 7, 9, 10:
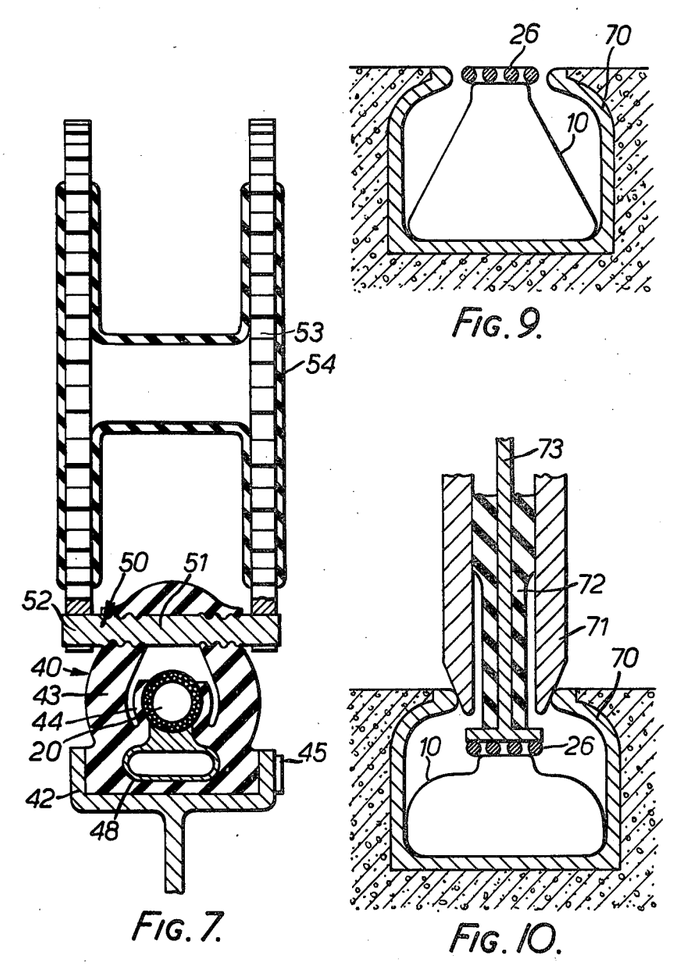
FIG. 7 is a cross sectional view of an arrangement giving a rack and pinion drive.
FIGS. 9 and 10 are views of an arrangement in a trough with and without a sandwich wheel collector pressing the segments down.

FIG. 7 is a view similar to FIG. 5 showing an arrangement in which the contact segments, in addition to collecting the current, also form the teeth of the rack of a rack-and-pinion drive enabling a light locomotive to pull a comparatively heavy load and negotiate steep gradients or even to climb vertically.

The shield is very similar to that of FIGS. 5 and 6 and bears the same reference numerals, but each contact segment is in the form of a straight bar 50 extending transversely through opposite walls of the shield with its middle portion 51 exposed inside the shield so that it can be pressed down into contact with the live conductor. Its end portions 52 project and form the teeth of a pair of pin racks to be engaged by a pinion comprising a pair of sprockets 53 provided with insulation 54 and secured together coaxially to make contact with the live conductor and at the same time afford a positive rack and pinion drive to the locomotive.

Each portion of each segment that passes through a wall of the shield is provided with a number of circumferential ribs and grooves. These are formed by rolling so that the ribs are of greater diameter than the remainder of the rod and they fit into holes in the shield of which the diameter is approximately a fit round the remainder of the rod so that the material of the shield is slightly stretched by the ribs to give a firm labyrinth seal. Even if there is an appreciable pressure difference between the inside and outside of the shield these may be distributed between the various ribs and give the effect of an airtight labyrinth seal.

The pinion 53 is mounted on the locomotive at such a level that as it passes over a rod it will press it down so that the middle portion of the rod comes into contact with the live conductor. The pinion is connected electrically through gearing to the shaft and thence the armature windings of an electric driving motor (not shown). The gearing may comprise a worm engaging a worm wheel mounted coaxially with the pinion, so that in addition to collecting current the pinion serves to provide a positive drive for the locomotive.

The invention may be applied to a multipole system, for example a two pole system for a single phase or D.C. unearthed supply. One such arrangement is simply a duplication of the single pole arrangement with each live conductor in a separate shield. In a preferred arrangement, however, shown in FIG. 8, a single shield 60 has an outer tube 61 enclosing two part-tubular inner portions 62 located side by side and each partially enclosing one of the live conductors 63.

For a three phase or three phase and neutral system a two pole arrangement and a single pole arrangement, or two two-pole arrangements, may be employed.

Figure 8:
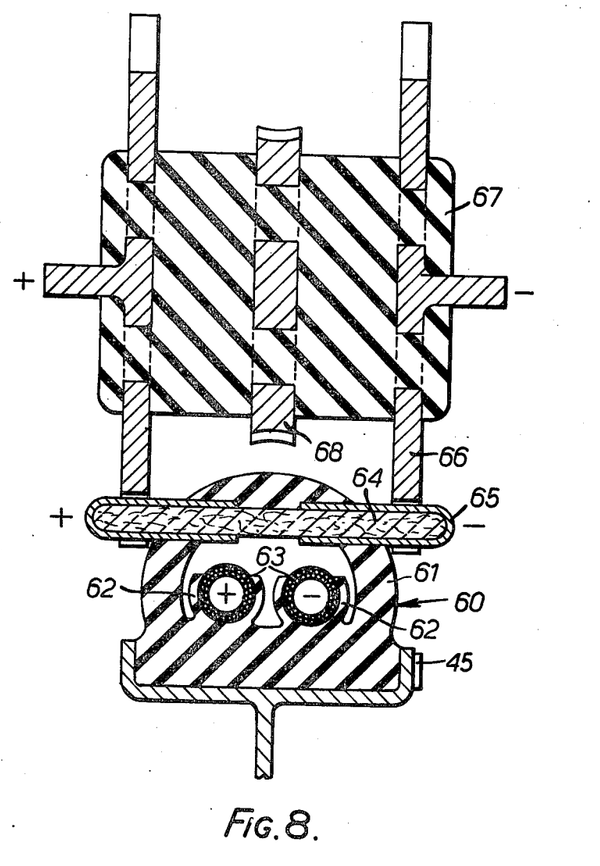
FIG. 8 is a similar view of a two pole arrangement.

For a rack drive each segment comprises a straight rod 64 e.g. of glass fibre with conducting end portions or sleeves 65 insulated from one another to be pressed into contact with the respective live conductors by a pair of coaxial sprockets 66 also insulated from one another but connected through conducting bearings or slip rings to opposite terminals of the motor circuit.

The pinion may comprise a solid block of epoxy resin in which are embedded the two sprockets 66 and 67 and a driving worm wheel 68 which is insulated from both of them.

In each arrangement the live conductor comprises a multistrand bare cable of copper or aluminium wound in coarse pitch helices, which may either be hollow or wound on a flexible insulating rubber or elastomeric core or a helical metal spring.

It is also provided with a covering of hard metal, for example in the form of a helically wound tape some ½ mm thick to form a durable contact surface, for example of stainless steel, hard brass, phosphor bronze, or a sintered material.

In a specific embodiment the continuous live conductor has an outside diameter of 25 to 30 mm. and can be depressed by a 200 mm. diameter sprocket to a depth of say 4 to 5 mm. without overstressing the conductor.

Where the current collecting device also affords a positive rack and pinion drive it is particularly desirable to provide keying members such as the dowels 45 to key the shield against longitudinal movement.

The shield may be provided with extra textile reinforcement between adjacent contact segments, and between segments and dowels.

The mounting of the supply conductor on a fixed support and that of the current collecting device on the vehicle may take various forms. In describing FIGS. 1 to 8 it has been assumed that the supply is at ground level and the current collector presses the shield downwards. In this case, for railway use the supply conductor assembly as described may rest on and be secured to the sleepers between the running rails or on a wide reservation.

The invention is also applicable to tram-ways, street cars, or trolley bus lines running on roads used by other vehicles. For such an application the row of contacts and shield are preferably accommodated (as shown in FIGS. 9 and 10) in a trough 70 for example of steel which is sunk into the road-way and has overhanging sides or a top with a narrow slot formed in it, through which the row of contacts is accessible. In the preferred arrangement the top of the trough is flush with the road-way and the row of contacts with the adjacent portion of the shield have their upper surface flush with the top of the trough and virtually fill the slot, as shown in FIG. 9, when not pressed down as shown in FIG. 10.

The current collector for this form of rail may be in the form of a sandwich wheel comprising a pair of outer metal discs 71 spaced apart and having chamfered edges to bear against the edges of the slot, and between them and insulated from them by insulation 72 and projecting from them, an inner annulus or disc 73 of slightly larger diameter to enter the slot and press down and make contact with the row of contact segments. The slot may be relatively narrow, its width not exceeding an inch or two, so that any large load which might be likely to press down the contact segments and render them live will be borne by the top of the trough. The outer metal discs may be bevelled and may provide an earth conductor.

In certain circumstances it may be preferable to employ an overhead current supply assembly with the current collector pressing upwards on it, arrangements similar to those described with reference to FIGS. 1 to 8 being inverted, and the current collector being mounted on a conventional pantograph.

In such cases in particular it may be desirable to provide more precise guiding of the support for the current collector assembly in relation to that of the current supply assembly both as regards relative lateral or horizontal movement and as regards relative vertical movement. For this purpose a trolley or bogie carrying the current collector wheels or rollers may also be provided with what may be termed reaction wheels running on rails and taking the reaction force corresponding to the force exerted by the collector on the segments to press them down and provide contact pressure with the live conductor.

As indicated above it is essential that there should be some degree of yielding of one or other contact surface after they have come into engagement. Thus, if the current collecting wheel does not displace the segment quite far enough electrical contact will not be established, whereas if it displaces it a little too far if both contacts were completely rigid and rigidly supported damage would occur to the contact surfaces, and the next time the segment was displaced slightly less far it would fail to make contact. By providing reaction wheels to guide the current collecting wheels in a vertical direction the range of yielding required can be considerably reduced.

Such an arrangement is also necessary if the locomotive is to climb vertically.

In describing FIGS. 1 to 6 it was assumed that the current collector had wide rollers, in which case their lateral position in relation to the supply assembly is not critical.

On the other hand where the current collecting wheels are narrow, and especially if they provide a rack and pinion drive, it will generally be necessary to provide means for guiding them laterally to keep them in line with the supply conductor.

Figure 11:
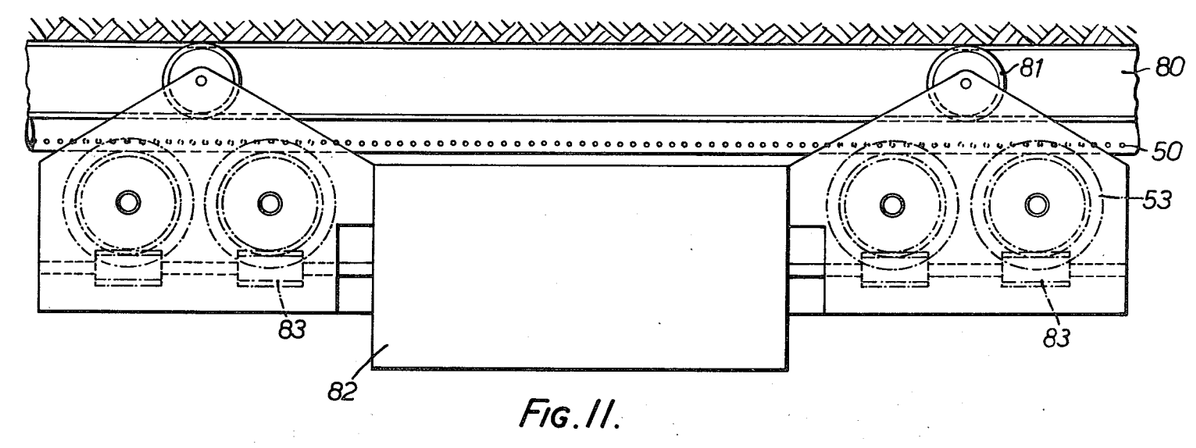
FIG. 11 is a side view of an arrangement employing an overhead current collecting bogie.

FIG. 11 shows an arrangement of this sort, in which the shield is mounted on an I beam 80, as shown in FIG. 7 but inverted, and the upper surfaces of the lower flange of the I beam form rails on which reaction wheels 81 run to take the weight of the trolley carrying the current collector and the reaction of the pressure between it and the contact segments. This form of the invention is particularly suitable for situations such as coal mines where it may be desirable to provide a very compact locomotive capable of towing a long train of trailer vehicles of small section at widely varying and sometimes very steep gradients.

In this case the rail 80 of I-section is secured to roof reinforcement by its upper flange while the upper surfaces of its lower flange serve as tracks for two bogies each comprising a pair of load bearing wheels 81. The live conductor is mounted under the lower flange of the I-beam inside a resilient rubber casing similar to that described in connection with FIG. 7 but inverted. As in that embodiment contact making rods 50 extend transversely through the insulating sheath and their ends form a pin rack for engagement with double pinions two on each bogie carried by the locomotive. The locomotive is suspended from its load bearing wheels and comprises an electric motor 82 driving the four double sprockets, through worm drives 83 at opposite ends of its shaft. In this case the motor is of course underneath the live conductor and the four double sprockets extend up into engagement with the ends of the rod segments from underneath, and press each rod upwards into contact with the live conductor.

Figure 12:
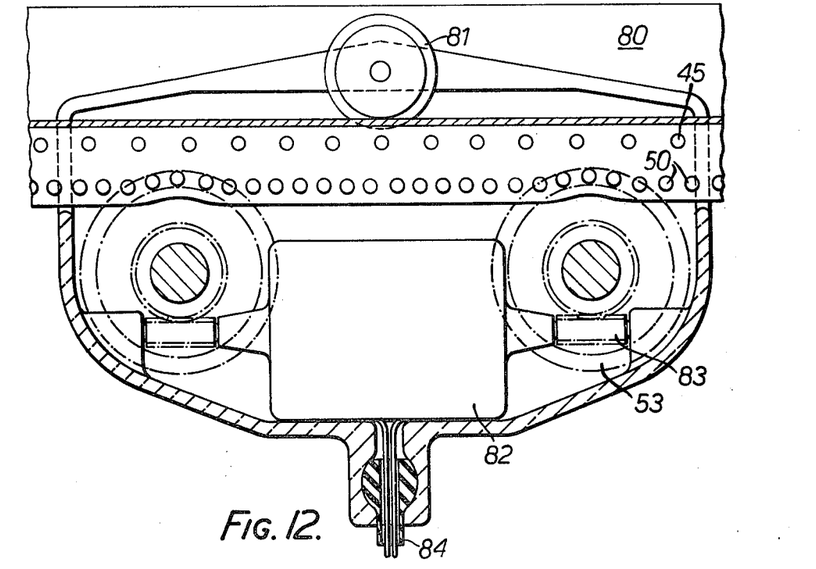
FIGS. 12 and 13 are side and end sectional elevations of current collector for a chair lift.
Figure 13:
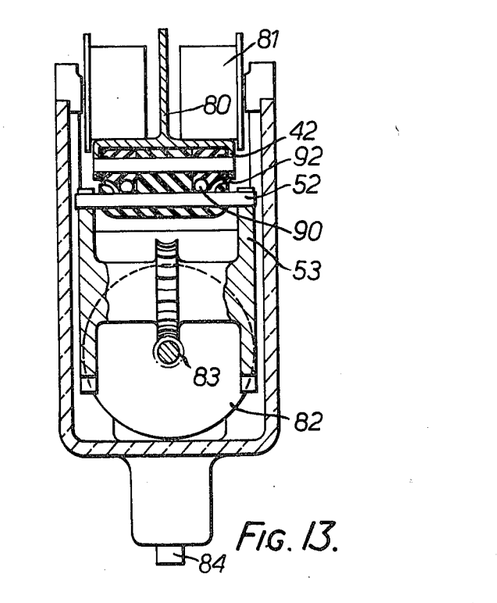

A further application of the invention shown in FIGS. 12 and 13, is to a domestic elevator or chair lift for assisting elderly or disabled people to move about and negotiate stairs. This may comprise a miniature and simplified version of the locomotive shown in FIG. 11, having a single pair of load or reaction wheels 81 and two pairs of driving and current collecting sprockets 53 driven by a small fractional horsepower motor 82. The locomotive runs on an elevated track which may turn corners and have horizontal as well as sloping portions, and, depending from it, is a tie bar 84 carrying a seat or saddle (not shown) and a foot rest.

Whilst the arrangement of the supply conductor and shield may be as in previous embodiments a modified arrangement is shown. Thus instead of employing a single central live conductor and relying on the side walls of the tyre to provide the resilience to separate the segments from it, the arrangement shown employs two live conductors 90 on opposite sides of a stout central web 91 of rubber which furnishes the required resilience. The web may have top and/or bottom flanges to form a body of T or I section and is provided with a flexible protective shield 92 to enclose, and prevent access to, the live conductors.

Figure 14:
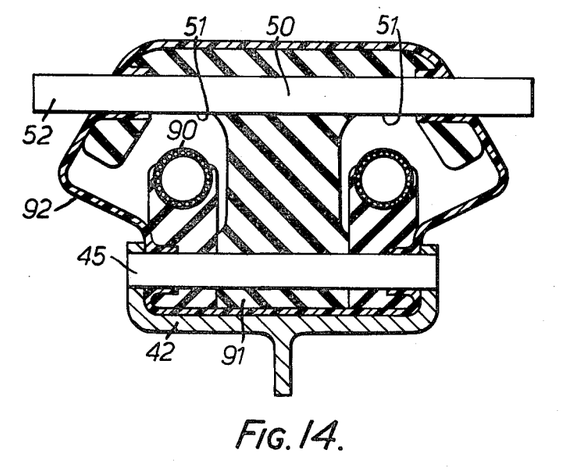
FIGS. 14 and 15 are cross sections of two further arrangements.
Figure 15:
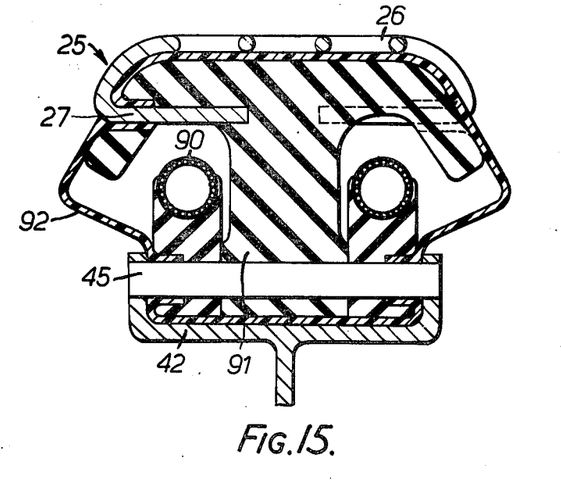

FIGS. 14 and 15 show such an arrangement in greater detail, FIG. 14 for an arrangement providing a rack drive as in FIG. 7, and FIG. 15 providing only current collection as in FIGS. 1 and 5.

As shown for a single pole arrangement each contact segment engages both live conductors which are of the same polarity, but for a two pole system the bar may comprise two conducting end portions insulated from one another as in FIG. 8, respectively engaging live conductors of opposite polarity.

It will be appreciated that the invention is not limited to the embodiments specifically described, and in particular the arrangement may be a combination of those shown in the drawings.

Thus, with the supply conductor at ground level the power bogie may still be provided with reaction wheels engaging the underside of the upper flange of an I-beam to resist the upward pressure on the current collecting wheels engaging the segments of the supply conductor. In a further arrangement for a mineral line a train of trailer skips run on conventional rails at ground level while a locomotive provided with a driver's cab hangs from an overhead monorail of I-section and has its weight taken by reaction or load wheels running on the lower flange of the rail while the current collector presses upwards on the supply assembly mounted on its underside. In yet a further arrangement both the locomotive and the train of trailers are supported by the overhead monorail.

In a further application a crane or fork-lift truck is connected by cables to a bogie running on a two-pole overhead current supply assembly. The bogie may incorporate a motor providing a rack drive and serve to tow the vehicle through the cables, or it may serve only as a current collector and be towed by the vehicle while supplying current to it through the cables.

Obviously, numerous modifications and variations of the present invention are possible in light of the above teachings. It is therefore to be understood that within the scope of the appended claims, the invention may be practiced otherwise than as specifically described herein.

I claim:

1. An electric current collection system comprising a continuously live conductor, a shield enclosing the continuously live conductor, and contact segments extending through the shield in a row extending along the length of the continuously live conductor and resiliently mounted so as normally to be electrically isolated from the continuously live conductor and from each other, said contact segments co-operating with a current collecting device running along the row to make electrical contact with an external contact surface of each segment in succession and displace the segment to bring an internal contact surface afforded by it into electrical connection with an internal contact surface afforded by the continuously live conductor, in which each segment includes a bar portion affording an internal contact surface and extending through the shield in a direction substantially perpendicular to the length of the live conductor and to the direction of displacement of the segment and in which segments are resilient so that the internal contact surface of a segment engaging the continuous live conductor is free to yield resiliently relatively to the external contact surface engaging the current collector.

2. A system as claimed in claim 1 in which the external contact surface for engagement by a current collector extends obliquely across the direction of movement of the collector.

3. A system as claimed in claim 1 in which each segment comprises wire generally in the form of a Z having two end limbs each of which has an end, the said end limbs being interconnected by a middle limb, each segment being bent so that the ends penetrate the sides of the shield to make contact with the live conductor while the middle limb extends obliquely across the top of the shield to be engaged by the current collector.

4. A system as claimed in claim 3, in which the successive segments overlap longitudinally so that a current collector member extending transversely across the shield will engage two or more segments simultaneously.

5. A system as claimed in claim 1 in which the shield is accommodated in a trough which is sunk flush into the road-way and has an upper surface affording means defining a narrow slot through which the row of contacts is accessible, and the row of contacts with the adjacent portion of the shield have their upper surface flush with the top of the trough and virtually fill the slot.

6. A system as claimed in claim 5 including a current collector comprising a sandwich wheel comprising a pair of outer metal discs spaced apart and having chamfered edges to bear against the edges of the slot, and an inner member of slightly larger diameter than said outer discs, said inner member disposed between said outer discs and insulated therefrom such that the inner member enters the slot, presses down and contacts the row of contact segments.

7. A system as claimed in claim 1 in which each segment is formed integrally in a single piece of conducting material.

8. A system as claimed in claim 1 in which each segment is formed from round rod material.

9. A system as claimed in claim 1 in which the major part of the shield comprises a member, referred to for convenience as a tyre, which comprises resilient insulating rubber-like material of arch section.

10. A system as claimed in claim 9 in which the section of the tyre is of truncated inverted "V" form.

11. A system as claimed in claim 10 in which the sides of the section are concave.

12. A system as claimed in claim 9 in which the section provides a stop which exhibits a substantial increase in stiffness when the deflection exceeds a predetermined amount.

13. A system as claimed in claim 9 in which the part of the shield remote from the segments is received by a rigid base of channel section, the said base carrying a plurality of flanges, with the tyre above the rigid base and the outer surface of the shield slopes downwards and outwards to skirt and overlie the rim of one of the plurality of flanges of the base to drain off rain.

14. A system as claimed in claim 9 in which the side surfaces of the tyre comprise longitudinal sheds and grooves to increase the electrical leakage path.

15. A system as claimed in claim 1 further comprising a rigid base for receiving a portion of the shield remote from the contact segments and keying means provided in said rigid base for interlocking said base to the shield so as to prevent relative longitudinal movement.

16. A system as claimed in claim 15 in which the rigid base is of channel section, the said base carrying a plurality of flanges, and the keying means comprise dowels extending transversely through the flanges and portions of the shield between them.

17. A system as claimed in claim 1 in which the current collecting device comprises a number of wheels or rollers in tandem.

18. An electric current collector system comprising a continuously live conductor, a shield enclosing the continuously live conductor, and contact segments extending through the shield in a row extending along the length of the continuously live conductor and resiliently mounted so as normally to be electrically isolated from the continuously live conductor and from each other, said contact segments cooperating with a current collecting device running along the row to make electrical contact with an external contact surface of each segment in succession and displace the segment to bring an internal contact surface afforded by the continuously live conductor, in which each segment includes a bar portion affording an internal contact surface and extending through the shield in a direction of displacement of the segment and in which each segment comprises a straight rod extending transversely through the shield with its ends projecting to form a pin rack and which includes a current collecting device comprising a pinion affording sprockets meshing with the said rack and providing the external contact surface of each segment.

19. A system as claimed in claim 18, wherein for two pole operation, each segment comprises a straight insulating rod extending transversely through the shield and having conducting members at opposite ends arranged to be pressed into contact with respective live conductors and wherein said system further includes a pinion comprising a pair of coaxial sprockets insulated from one another for pressing said conducting members into contact with said live conductors.

20. An electric traction current collection system for a vehicle, comprising a continuously live conductor, a shield enclosing the continuously live conductor, and contact segments extending through the shield in a row extending along the length of the continuously live conductor and resiliently mounted so as normally to be electrically isolated from the continuously live conductor and from each other, and a current collecting device carried by the vehicle and adapted to run along the row to make electrical contact with an external contact surface of each segment in succession and displace the segment to bring an internal contact surface afforded by it into electrical connection with an internal contact surface afforded by the continuously live conductor, in which the current collecting device comprises an electrically driven pinion and the segments extend through the insulating sheath and afford conducting teeth projecting so as to provide the external contact surfaces and to form a rack meshing with the driving pinion to effect a positive rack and pinion drive.

21. A system as claimed in claim 20 in which each segment includes a straight rod extending transversely through the shield.

22. A system as claimed in claim 20 in which the internal contact surface of the continuously live conductor is free to yield relatively to its support.

23. A system as claimed in claim 22 in which the continuously live conductor includes a multiple-strand helically wound cable.

24. A system as claimed in claim 22 in which the continuously live conductor is of hollow tubular form.

25. A system as claimed in claim 22 in which the continuously live conductor has a resilient core fabricated from a material from the group consisting of rubber or a helical metal spring.

26. A system as claimed in claim 22 in which the continuously live conductor has a thin covering of hard metal presenting a durable contact surface, said metal selected from the group consisting of stainless steel, hard brass, or a sintered material.

27. A system as claimed in claim 20 which includes a pair of continuously live conductors and in which the segments are supported on a web of resilient material located between the two live conductors.

28. A system as claimed in claim 20 further comprising a rigid base for receiving a portion of the shield remote from the contact segments, said rigid base affording rails on surfaces remote from the shield, and the current collector includes reaction wheels running on such rails to control the extent to which the current collector displaces the segments towards the continuously live conductor.

29. A system as claimed in claim 28 in which the reaction wheels are provided with means for locating the current collector laterally.

30. A system as claimed in claim 29, in which said locating means comprises flanges provided on said reaction wheels.

31. A system as claimed in claim 20 wherein, for two pole operation, each segment comprises a straight insulating rod extending transversely through the shield and having conducting members at opposite ends arranged to be pressed into contact with respective live conductors, and wherein said system further includes a pinion comprising a pair of coaxial sprockets insulated from one another for pressing said conducting members into contact with said live conductors.

* * * * *